United States Patent [19]

Driska

[11] Patent Number: 5,104,607
[45] Date of Patent: Apr. 14, 1992

[54] AIR CUSHION TABLE GAME AND METHOD OF MAKING SAME

[75] Inventor: John I. Driska, Princeton Junction, N.J.

[73] Assignee: Azrak-Hamway International, Inc., New York, N.Y.

[21] Appl. No.: 652,387

[22] Filed: Feb. 26, 1991

Related U.S. Application Data

[63] Continuation of Ser. No. 447,219, Dec. 7, 1989, abandoned.

[51] Int. Cl.⁵ .................... B29C 49/00; A63F 7/06
[52] U.S. Cl. .................... 264/536; 264/528; 273/126 A; 273/85 B
[58] Field of Search ... 273/126 R, 126 A, 85 R–85 B, 273/85 E, 85 F, 118 A, 119 A, 119 R; 264/DIG. 33, 512, 513, 528, 536, 537, 540, 156, 154

[56] References Cited

U.S. PATENT DOCUMENTS

| | | | |
|---|---|---|---|
| 3,429,544 | 2/1969 | Williams | 273/126 A |
| 3,722,888 | 3/1973 | Ducharme | 273/126 R |
| 3,773,325 | 11/1973 | Crossman et al. | 273/126 A |
| 3,927,884 | 12/1975 | Glass et al. | 273/119 R |
| 3,927,885 | 12/1975 | Crossman et al. | 273/126 R |
| 3,931,970 | 1/1976 | Cecchetti | 273/85 D |
| 3,931,974 | 1/1976 | Goldfarb et al. | 273/126 R |
| 3,954,267 | 5/1976 | Freeman et al. | 273/126 A |
| 3,992,009 | 2/1977 | Trbovich | 273/126 R |
| 4,017,078 | 4/1977 | Goldfarb et al. | 273/126 A |
| 4,017,079 | 4/1977 | Apellaniz | 273/126 R |
| 4,076,242 | 2/1978 | Joseph | 273/85 B |

Primary Examiner—Edward M. Coven
Assistant Examiner—Sebastiano Passaniti
Attorney, Agent, or Firm—Amster, Rothstein & Ebenstein

[57] ABSTRACT

In an air cushion table game, such as air hockey, the air bed, which has an upper surface defining a playing surface, comprises a top layer of material having a multiplicity of air jets exhausting upwardly therethrough and arrayed in a substantially uniform pattern over the playing surface of the top layer to form an air cushion and a bottom layer of material disposed below and connected to the top layer. The top and bottom layers define a single plenum extending therebetween and communicating with each of the air jets, the plenum being of unitary one-piece integral blow molded construction. Preferably, the air bed includes a bumper strip defining a boundary of the playing surface upon the air bed, and the air bed, including the bumper strip, is of unitary one-piece integral blow molded construction.

6 Claims, 4 Drawing Sheets

AIR CUSHION TABLE GAME AND METHOD OF MAKING SAME

This is a continuation of co-pending application Ser. No. 447,219 filed on Dec. 7, 1989, now abandoned.

BACKGROUND OF THE INVENTION

The present invention relates generally to air cushion table games and methods for making the same, and more particularly to an air hockey game and a method of making the same.

Air cushion table games are well known. Typically, the table includes an air bed or perforated surface to which air under pressure is supplied from below, creating a multiplicity of closely spaced air jets upon which a game puck floats without touching the table surface. The table is bounded by a sturdy bumper rail, which imparts a solid rebound to the puck. Each player is provided with a disc-shaped bat, which he slides across the table surface and into contact with the puck. An automatic scoring system is optionally provided to receive and record the passage of pucks not blocked by the defending player. See, for example, U.S. Pat. Nos. 3,773,325; 3,871,585; 3,887,187; and 3,927,885 relating to air hockey games; and U.S. Pat. No. 3,927,884, relating to another type of air cushion table game. However, the known air cushion table games have not proved to be entirely satisfactory from the point of view of either the manufacturer or the user.

From the point of view of the manufacturer, the known air cushion type games are produced from a great multitude of individual components which must not only be individually produced, but then arduously assembled to produce the final game. For example, the plenum or air bed is typically formed of at least two major pieces, an upper layer composed of flake board or melamine laminated onto pressed wood backed with phenolic and a lower layer of plywood. The pressed wood is grooved to define separate horizontally extending air channels, each air channel feeding with air only its own selected group of vertical air jets formed in the flake board or melamine. Typically various intermediate spacing stringers or cross braces extend the length and/or width of the air bed to rigidify the plenum thus formed. The plenum is usually surrounded by a metal bumper strip, and the entire assembly is mounted in a rigidifying wooden frame. Skilled labor or sophisticated equipment is required to assemble the parts of the plenum in such a manner as to insure that the upper and lower layers are secured together without air leaks which would undesirably dissipate the air pressure built up in the plenum during play of the game. Clearly, labor and material costs could be reduced in the manufacturing process if the plenum and bumper strips were formed in a single operation to provide a one-piece integral construction of sufficient rigidity and internal structure that air channels, spacing stringer, cross braces, and a rigidifying frame were not required.

From the point of view of the user, the multicomponent nature of the game, and in particular the plenum thereof, can lead to a variety of problems under the shocks and impacts occurring during typical play of the game and the even more severe ones which may occur during handling of the game, e.g., when it is dropped, etc. For example, air leaks may occur at the interface of the top and bottom layers of the plenum so that the puck is not properly supported on the playing surface by the weakened air cushion or the fan providing the air cushion must work harder to produce the desired air cushion, thus leading to possible overheating of the fan motor. The desired original orientation of the bumper strips relative to the playing surface may vary over time, thereby leading to unexpected rebounds, as the means securing the bumper strips and the plenum together respond to normal and abnormal usage of the game. Thus, from the point of view of the user, a game in which the plenum was of integral one-piece construction, preferably with the bumper strips, would lead to a sturdier and more reliable game.

Accordingly, it is an object of the present invention to provide an air cushion table game in which the plenum is of a unitary one-piece integral construction.

Another object is to provide such a game in which the air bed, including both the plenum and the bumper strips, is of unitary one-piece integral construction.

A further object is to provide such a game which does not require separate rigidifying elements.

A final object is to provide a simple, rapid and economical method of making such a game.

SUMMARY OF THE INVENTION

It has now been found that the above and related objects of the present invention are obtained in an air cushion table game of novel construction. In its conventional aspects, the game comprises in combination an air bed having an upper surface defining a playing surface, and means for creating an air cushion above the playing surface. The game additionally includes a game piece having an area and weight such that it floats upon the air cushion during play and is capable of moving over the playing surface generally without touching it, and means for engaging the game piece so as to cause it to move upon the air cushion and over the playing surface. In the novel aspects of the game, the air bed comprises top and bottom layers. The top layer of material has a multiplicity of air jets exhausting upwardly therethrough and arrayed in a substantially uniform pattern over the playing surface of the top layer to form the air cushion. The bottom layer is of the same material and is disposed below and connected to the top layer. The top and bottom layers together define a single plenum extending therebetween and communicating with each of the air jets, the plenum being of unitary one-piece integral blow molded construction.

Preferably the bottom layer has a duct extending through a surface thereof and communicating with the plenum, and the means for creating the air cushion comprises means for forcing air through the duct, whereby the air will flow and exhaust upwardly through the air jets.

In a preferred embodiment the air bed is of unitary one-piece integral blow molded construction. Where the air bed includes a bumper strip defining a boundary of the playing surface upon the air bed, the entire the air bed (including the bumper strip) is of unitary one-piece integral blow molded construction. The air bed is preferably formed of high density polyethylene.

The periphery of the bottom layer is connected to the periphery of the top layer, and a central portion of the bottom layer is connected at a plurality of spaced points (preferably by welds) to a central portion of the top layer to rigidify the plenum. The bumper strip also serves as a rigidifying frame for the remainder of the air bed.

The present invention further encompasses an improved method of making an air cushion table game wherein a game piece floats upon an air cushion over the upper surface of an air bed. The air bed has a top layer of material having a multiplicity of air jets exhausting upwardly therethrough and arrayed in a substantially uniform pattern over the surface thereof to form the air cushion, and a bottom layer of material disposed below and connected to the top layer. The top and bottom layers defining a single plenum extending therebetween and communicating with each of the air jets. The improvement comprises the step of blow molding the plenum to form a unitary one-piece integral construction, including the top and bottom layers. Preferably the air bed is blow molded as a unitary one-piece integral construction.

Where the air bed additionally includes a bumper strip defining a boundary of the playing surface upon the upper surface of the air bed, the entire air bed (including the bumper strip) is blow molded as a unitary one-piece integral construction. While the construction is still in the mold, after the construction cools below its forming temperature and before it cools to room temperature, the air jets are formed in the top layer and a duct is formed through the bottom layer.

BRIEF DESCRIPTION OF THE DRAWING

The above brief description, as well as further objects and features of the present invention, will be more fully understood by reference to the following detailed description of the presently preferred, albeit illustrative, embodiments of the present invention when taking in conjunction with the accompanying drawing wherein.

DETAILED DESCRIPTION OF THE PREFERRED EMBODIMENTS

Figure 1:
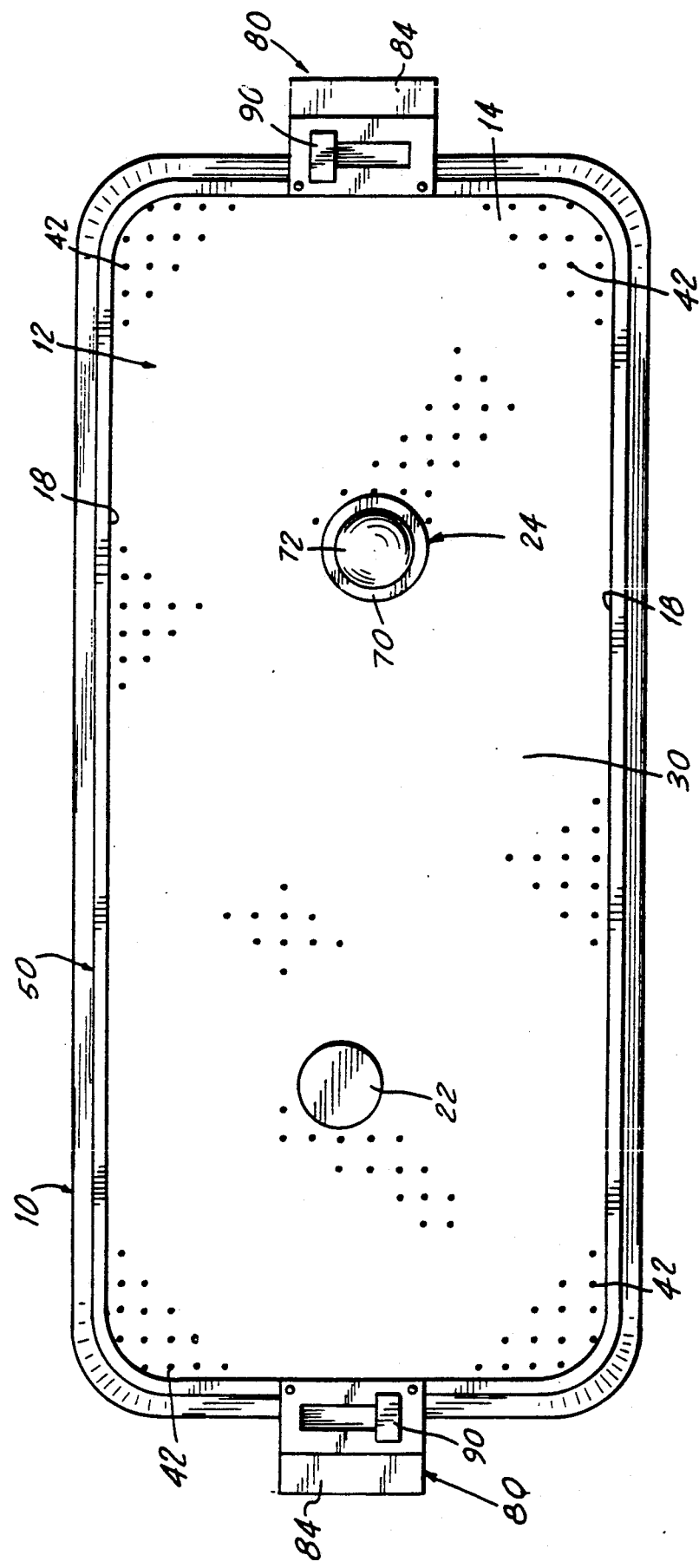
FIG. 1 is a top plan view of an air cushion table game according to the present invention.
Figure 2:
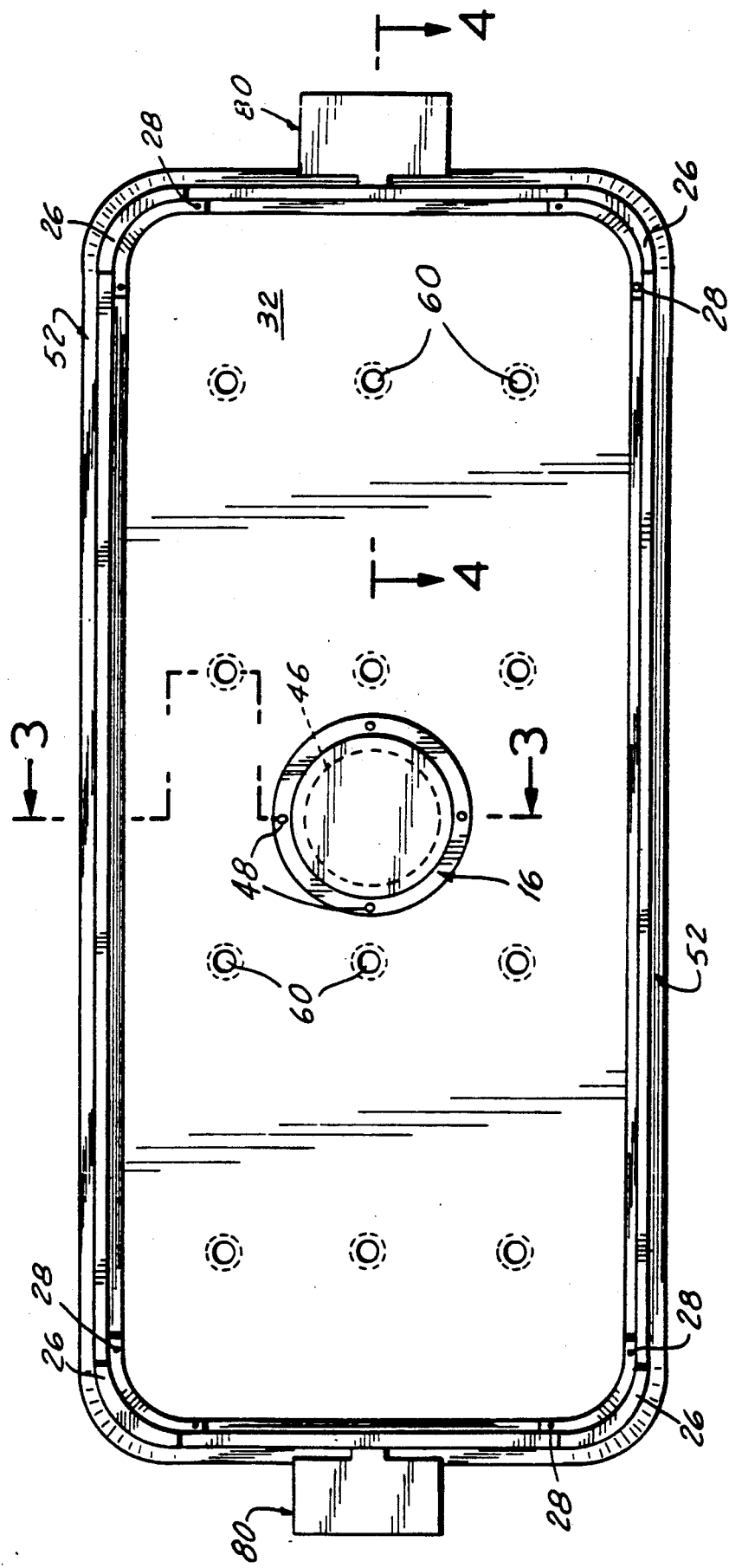
FIG. 2 is a bottom plan view of the air cushion table game.

Referring now to the drawing, and in particular to FIGS. 1 and 2 thereof, therein illustrated is an air cushion table game according to the present invention, generally designated by the reference numeral 10. In its conventional aspects the game comprises basically an air bed generally designated 12 having an upper surface defining a substantially flat playing surface 14, and means for creating an air cushion above the playing surface 14, such as a fan generally designated 16 (see FIG. 2). A bumper strip 18 defines a boundary of the playing surface 14 upon the air bed 12. A housing may be placed over the fan 16 for the purposes of appearance and noise abatement, a series of apertures in the fan housing being provided to insure a sufficient air supply to the fan intake.

The game is played with a game piece, such as a puck 22, having an area and weight such that it floats upon the air cushion during play and is capable of moving over the playing surface 14 generally without touching it. Means for engaging the game piece 22, such as a bat generally designated 24, are provided for each contestant so as to cause the game piece 22 to move upon the air cushion and over the playing surface 14. Typically goals generally designated 80 will be provided at opposite ends of the playing surface 14 with the contestants standing at opposite ends of the table 10 and attempting to score by knocking the puck 22 into the opponent's goal 80. Optionally an automatic scoring system is provided such that movement of the puck 22 into a player's goal (that is, the scoring of a goal) is clearly indicated—for example, by the flashing of a light—and, if desired, cumulative scores may be maintained on a toteboard or the like.

External legs 26 (which may be injection molded) are secured to the air bed 12 by screws 28 or other means in order to raise the playing surface 14 to an appropriate height, depending upon whether the legs 26 are to rest on a floor or a table top (as shown). Optionally each leg is independently adjustable in height to enable minor modifications in the height of the playing surface and to enable leveling of the playing surface.

Figure 3:
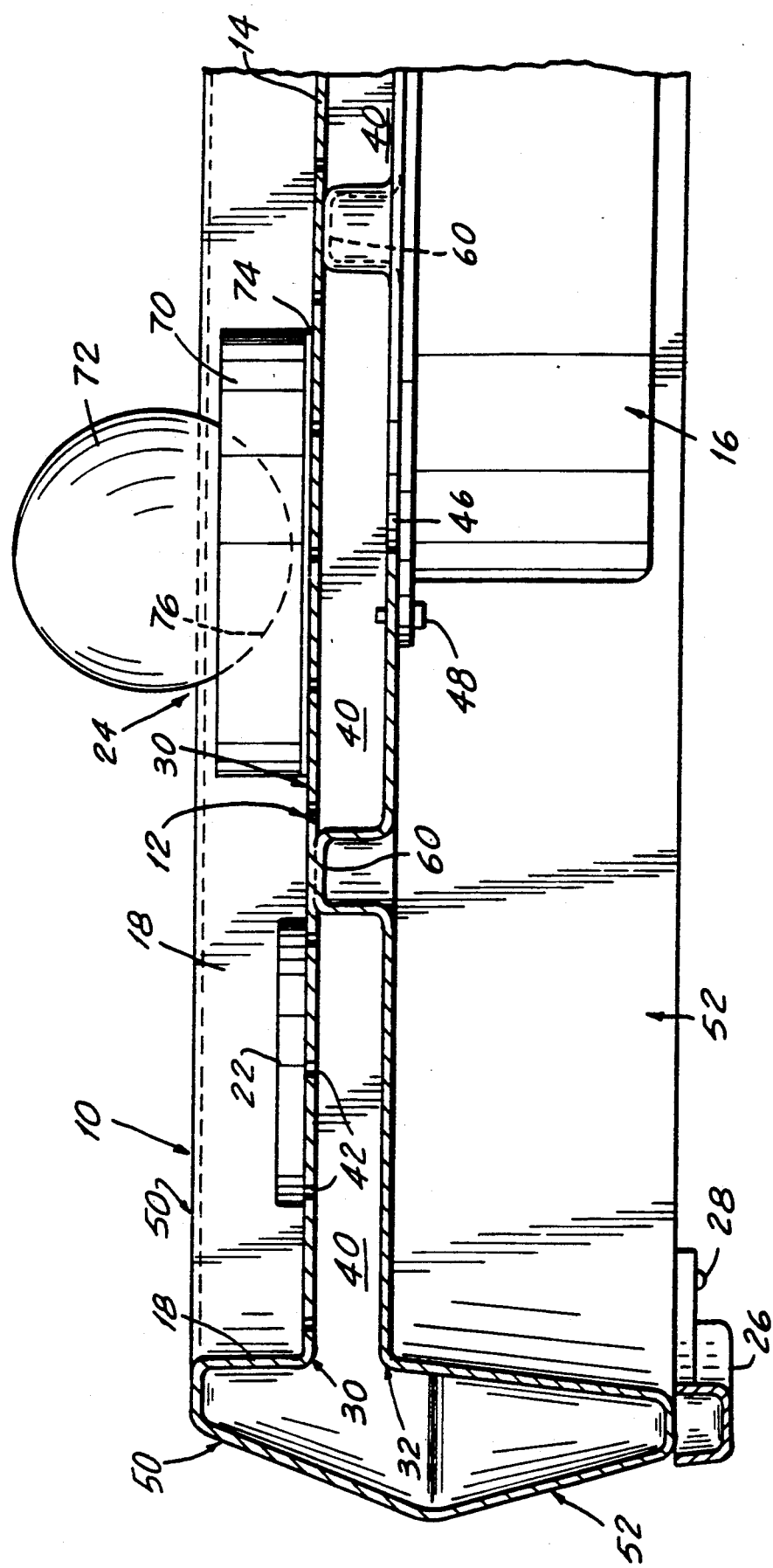
FIG. 3 is a sectional view taken along the line 3—3 of FIG. 2.
Figure 4:
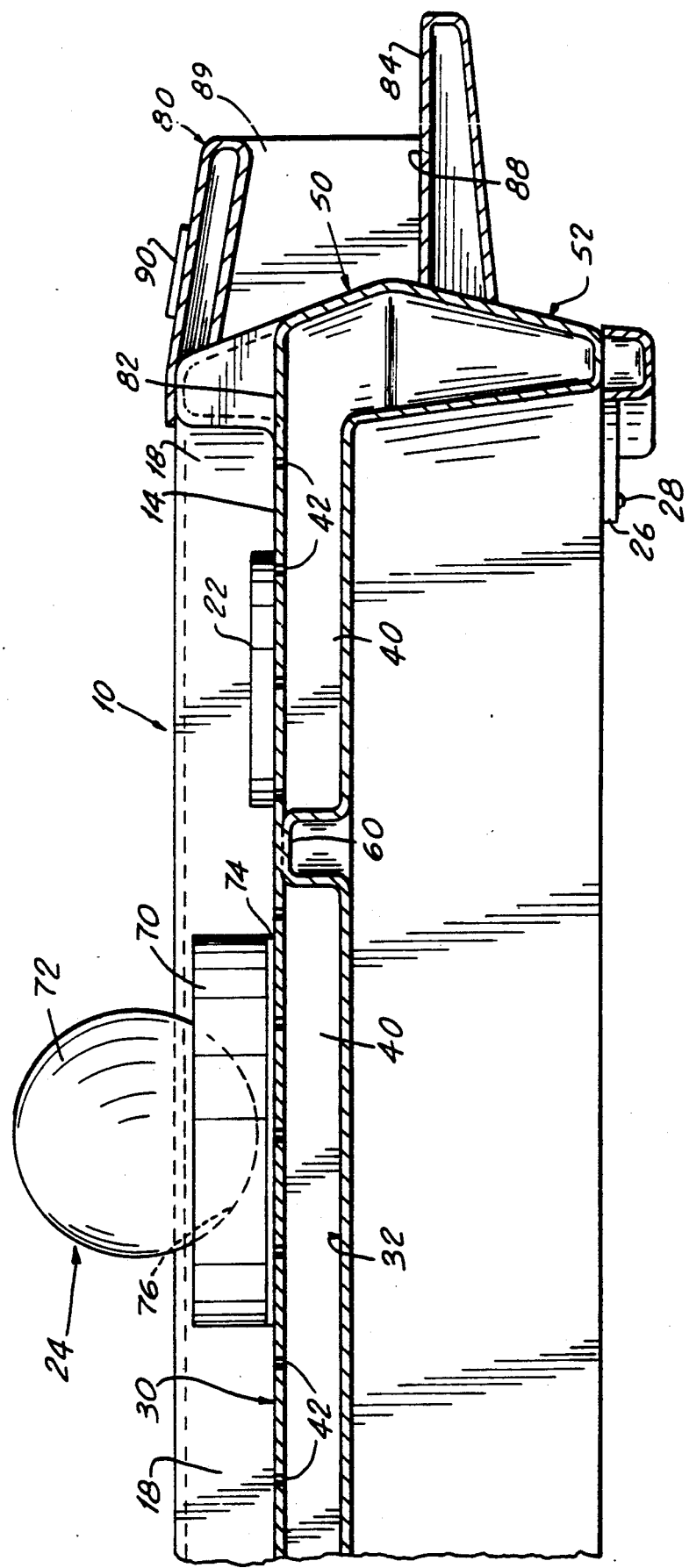
FIG. 4 is a sectional view taken along the line 4—4 of FIG. 2.

Turning now to the novel aspects of the present invention, as illustrated in FIGS. 3 and 4, the air bed 12 comprises a top layer generally designated 30 and a bottom layer generally designated 32. The top and bottom layers 30, 32 are formed of the same blow-moldable plastic material, preferably a high density polyethylene, although other plastics such as polypropylene may also be used. The bottom layer 32 is disposed below and connected to the top layer 30 with the top and bottom layers 30, 32 defining a single plenum 40 extending therebetween.

More particularly, the top layer 30 defines a multiplicity of air jets or apertures 42 extending upwardly therethrough and arrayed in a substantially uniform pattern over the playing surface 14 to form the air cushion when air is blown through them from the plenum 40. Preferably the air jets 42 are about 0.040 inch in diameter and disposed on a 1"×1" grid (i.e., with the center points of the air jets 42 in a given row or column being spaced apart by about one inch). Each of the air jets 42 is in gaseous communication with the plenum 40 so that a build up of air pressure within the plenum 40 relative to the ambient atmosphere causes the air within the plenum 40 to exhaust upwardly through the multiplicity of air jets 42.

The bottom layer 32 has a duct or opening 46 therethrough communicating with the plenum 40. The fan 16 for creating an air cushion above the playing surface 14 is in gaseous communication with the duct 46 for forcing air therethrough, so that the air will enter the plenum 40 and eventually flow and exhaust upwardly through the air jets 42 to form the air cushion above the playing surface 14. For example, the housing of fan or blower 16 may be mounted by screws 48 to the bottom layer 32 in vertical alignment with duct 46. While the duct is illustrated as centrally disposed on the bottom layer 32, with the fan 16 thereunder, clearly the duct and fan may be in other locations as well.

The top layer 30 preferably defines along its periphery an inverted U-shaped curve 50, the inwardly-facing leg of which is operatively substantially vertically disposed to the playing surface 14 and constitutes the integral bumper strip 18. The bumper strip 18 extends vertically upwardly from the playing surface 14 to a height of approximately ⅜ inch, the inner face thereof being smooth so that it does not exert any vertical forces upon a striking puck which could cause it to take off. The bottom layer 32 preferably defines along its periphery a U-shaped curve 52 having a height of about 2½ inches and constituting an integral leg to which the external leg 26 may be secured. The outer legs of the curve 50, 52 meet at the free ends thereof so that the plenum or chamber 40 is air-tight except for the duct 46 in the bottom layer 32 and the air jets 42 in the top layer 30. To this end, screws 28, 48 and any others which pierce a surface of the plenum are provided with gaskets, sealers or the like (not shown) as necessary to effect an air-tight connection.

The bottom layer 32 is formed with a plurality of spaced apart, upwardly projecting integral lugs 60. The upper portions of lugs 60 are welded during the molding process to the bottom surface of the upper layer 30 intermediate the air jets 42 so as not to block the air jets 42 and so as to enable the single plenum 40 to feed each of the air jets 42. It will be appreciated that while the top layer curve 50 defining the integral sidewall or bumper strip 18 and the bottom layer curve 52 defining the integral leg serve to rigidify the air bed 12 generally, and the plenum 14 thereof specifically, the projections 60 serving a supporting role in maintaining the desired spacing and juxtaposition of the top and bottom layers 30, 32 of the plenum 40. While the projections 60 are illustrated as cylindrical in cross section, clearly square, conical or other shape projections may be similarly employed. The projections 60 are preferably about ⅛ inch in diameter, so as to not interfere with the flow of air to the surrounding air jets 42 spaced 1 inch apart, and set in a 5"×5" grid.

In order to define at each end of the playing surface 14 a goal 80 for receipt of the puck 22, the top layer 30 defines at each end of the playing surface 14 a flat or interruption 82 in the bumper strip 18 so that a puck 22 sliding over the playing surface 14 can smoothly pass off the playing surface 14 through the flush flat 82. A separately formed goal frame 84 (typically injection molded) is secured to the top layer 30—for example, by screws 86—and defines a pocket 88, typically below the level of playing surface 14, to receive a puck 22 which has passed through the flat 82, and a hand opening 89 through which a player can easily remove the puck 22 from the pocket 88 after a goal is scored in order to put the puck 22 in play again. If desired, the goal 80 may additionally include means for keeping track of the number of goals scored, such as a movable pointer or slide 90, the position of the pointer or slide 90 relative to numerical indicia thereabout indicating the number of goals scored by one side.

While the dimensions of the game may be varied greatly depending on the type of game involved and the scale employed, for a 20"×44" game, the duct 46 is preferably about 5 inches in diameter; the air jets 42, about 0.040 inch in diameter and set in a 1"×1" grid; and the projections 60, about ⅛ inch in diameter and set in a 5"×5" grid. The walls of the plenum (that is, the top layer 30 and bottom layer 32) are preferably about 0.08–0.10 inch in thickness.

According to the present invention, the entire air bed 12—including the plenum 40, the bumper strip 18 and the projections 60—is formed in a single simple, rapid and economical blow molding operation. The resultant air bed 12 is thus of one-piece integral construction, all formulated from the same plastic material. As blow molding is a well recognized molding technique, familiar to those skilled in the molding art, it is not deemed necessary to provide further details thereof herein.

After the end of the blow molding operation, and after the plastic has cooled below its softening point or forming temperature (e.g., 170°–190° F.), but while the plastic is still in the mold and above room temperature (typically at a temperature of 130°–150° F.), the air jets 42 are die cut through the top layer 30 and the duct 46 is die cut through the bottom layer 32. For example, the upper and bottom halves of the mold may be equipped with respective extendible die punches which are lowered through the top layer 30 and raised through the bottom layer 32 to form the air jets 42 and duct 46, respectively, after these layers 30, 32 have cooled below the forming temperature of the plastic but before they have cooled to room temperature. If desired, however, the forming of air jets 42 or duct 46 or both may be performed after removal of the plastic from the mold, e.g., by punching or router cutting, respectively. Finally, the plastic is removed from the mold, the external legs 26 are secured to the integral legs of the bottom layer curve 52, the fan 16 is secured to the bottom layer 32 about the duct 46, and the goal frames 84 are attached to the top layer 30.

Thus the manufacturing process is simple, rapid and economical, with the entire air bed 12 being a unitary, integral, one-piece construction formed of a single material in a single molding operation, without any need for skilled labor to carefully assemble separate air bed components together to prevent leakage from the plenum 40 and appropriately position the bumper strip 18 relative to the playing surface 14. As the projections 60 and curves 50, 52 of the plenum provide rigidity to the structure, separate rigidifying elements are not required to be added thereto. Optionally bottom layer 32 may be blow molded with rigidifying ribs for providing additional rigidity to the plenum. The resultant air bed, being of one-piece integral unitary construction, is extremely sturdy and highly resistant to damage during normal use and even abuse.

In order to insure that the air escaping through the various air jets 42 is at the same velocity, regardless of the distance of the particular air jet 42 from the duct 46, the vertical spacing between the bottom surface of the upper layer 30 and the upper surface of the bottom layer 32 may be varied so as to compensate for the loss of air volume reaching the further air jets 42 relative to the nearer air jets 42. To this end, if the duct 46 is disposed in the center of the bottom layer 32, as illustrated, the lower surface of the upper layer 30 or the upper surface of the bottom layer 32 (and, indeed the entire bottom layer 32) may be concave so that the vertical spacing adjacent the peripheral air jets 42 is less than the vertical spacing adjacent the more central air jets 42, thereby to compensate for the loss of air volume intermediate the central and peripheral air jets and thus maintain a constant air velocity through all of the air jets 42 and thereby a uniform air cushion over the playing surface 14.

The puck 22 is typically a flat circular disc, preferably made of a high-density thermoplastic, e.g., high impact polystyrene or polypropylene With a diameter of three inches and a thickness of one-quarter inch, the weight of the puck 22 will be supported by at least four air jets 42 at all times.

The bat 24 is typically formed basically of a bat body 70 and a handle 72 fastened atop the bat body 70. The bat body 70 is a thick disc, preferably of a high-density thermoplastic, such polyethylene, covered on the bottom with a thin layer of felt 74 to avoid scarring of the playing surface 14 of the air bed 12. The top of the bat body 70 is dished as at 76 primarily for two reasons: first, to lower the center of gravity of the bat by lowering the handle portion, and second, to provide protection for the fingers of the player. The spherical handle 72, such as a billiard ball, is attached to the center of the bottom of the bat body 70 at 76 as by a screw (not shown) extending up through the bottom of bat body 70 and into the handle 72. This configuration lowers the center of gravity of the billiard ball-like handle 72 and the point of application of any force which may be exerted by the contestant's hand to a level closest to the level of the center of gravity of the puck 22 to minimize the "tuck" effect i.e., the vertical striking edge of the bat body 70 tucking under the puck 22 so that under impact the puck takes off from the air bed 12 and leaves the table 10. The thickness of the bat body 70 (i.e. the height of its vertical side face) should be at least twice the thickness of the puck 22 and slightly greater than the height of any goal opening in order to avoid any possibility of the bat body 70 sliding under the puck 22, permitting the puck 22 to strike the hand of the contestant holding the handle 72, and preventing the bat body 70 from being caught in the goal. In a preferred embodiment, the height of the vertical side face of the bat body 70 is approximately one inch, and the thickness of the puck 22 is approximately one-quarter inch.

It is important that the sides of the puck 22, bat 24, and bumper strip 18 be as nearly mutually vertical as feasible to avoid imparting to the puck 22 an angle of attack which causes it to leave the playing surface 14. Further, in order to provide the contestant with a feeling of solid contact when hitting the puck, and further to avoid any tucking or other reactive movement of the bat upon contact with the puck, it has been found most advantageous to use a bat-to-puck weight ratio of approximately 10-to-1.

During play of the game, a puck 22 slides virtually friction free across the playing surface 14 of the air cushion table 10. Contestants (not shown), standing at opposite end of the table 10, slide their bats 24 across the playing surface 14 and attempt to knock the puck 22 into the opponent's goal. Each player attempts to score by sliding his bat 24 into the puck 22 so as to knock it either directly into the opponent's goal or bank it off of the bumper strip 18 into the opponent's goal. The puck 22 moves very fast when solidly hit and, unless intercepted off center by the opposer's bat 22, will quickly return to the striking player's end of the table. This high speed rebound action by the puck tends to force the contestants alternately into offensive and defensive roles for brief periods of time depending upon who has gained the control of the puck.

Now that the preferred embodiments of the present invention have been shown and described in detail, various modifications and improvements thereon will become readily apparent to those skilled in the art. Accordingly, the appended claims are to be construed broadly and in a manner consistent with the spirit and scope of the invention described herein.

I claim:

1. In a method of making an air cushion table game wherein a game piece floats upon an air cushion over the upper surface of an air bed, the air bed having a top layer of material having a multiplicity of air jets exhausting upwardly therethrough and arrayed in a substantially uniform pattern over the surface thereof to form the air cushion and a bottom layer of material disposed below and connected to the top layer, the top and bottom layers defining a single plenum extending therebetween and communicating with each of the air jets, the improvement comprising the steps of:
   (A) blow molding the plenum to form in a single blow molding operation a unitary one-piece integral construction, including said top and bottom layers, which is essentially airtight; and
   (B) while the construction is in the mold, after the construction has cooled below its forming temperature but before it cools to room temperature, forming the air jets in the top layer to avoid burr formation.

2. The method of claim 1 wherein the air bed is blow molded as a unitary one-piece integral construction.

3. The method of claim 2 wherein said air bed additionally includes a bumper strip defining a boundary of the playing surface upon the upper surface of the air bed, and the air bed including the bumper strip is blow molded as a unitary one-piece integral construction.

4. The method of claim 1 wherein the air jets are formed in the top layer while it is in the mold after the top layer cools below its forming temperature but before the top layer cools to room temperature.

5. The method of claim 1 wherein a duct is formed through the bottom layer while it is in the mold after the bottom layer cools below its forming temperature but before the bottom layer cools to room temperature.

6. In a method of making an air cushion table game wherein a game piece floats upon an air cushion over the upper surface of an air bed, a bumper strip defining a boundary of the playing surface upon the upper surface of the air bed, the air bed having a top layer of material having a multiplicity of air jets exhausting upwardly therethrough and arrayed in a substantially uniform pattern over the surface thereof to form the air cushion and a bottom layer of material disposed below and connected to the top layer and having a duct therethrough to receive forced air, the top and bottom layers defining a single plenum extending therebetween and communicating with each of the air jets and with the duct, the improvement comprising the steps of:
   (A) blow molding the air bed, including the top layer, the bottom layer and the bumper strip, to form in the mold a unitary one-piece integral construction;
   (B) while the construction is in the mold, after the construction has cooled below its forming temperature but before it cools to room temperature, forming the air jets in the top layer and the duct in the bottom layer.

* * * * *